United States Patent [19]

Russo

[11] Patent Number: 5,390,064
[45] Date of Patent: Feb. 14, 1995

[54] CURRENT LIMITERS IN POWER UTILITY APPLICATIONS

[75] Inventor: Carl Russo, Loveland, Ohio

[73] Assignee: American Superconductor Corp., Westoborough, Mass.

[21] Appl. No.: 909,949

[22] Filed: Jul. 7, 1992

[51] Int. Cl.⁶ ............................ H02H 7/04; H02J 3/06
[52] U.S. Cl. ........................................ 361/35; 361/38; 323/329; 323/360
[58] Field of Search ................ 361/19, 141, 35, 38, 361/10, 11; 336/DIG. 1, 30, 155; 307/306, 314, 90, 245, 541; 323/360, 361, 328, 329, 332, 334, 335, 240, 247, 249, 302

[56] References Cited

U.S. PATENT DOCUMENTS

| | | | |
|---|---|---|---|
| 4,262,245 | 4/1981 | Wendt | 323/308 |
| 4,700,257 | 10/1987 | Bekhaled | 361/19 |
| 4,894,556 | 1/1990 | Hilal et al. | 307/90 |
| 4,907,246 | 3/1990 | Kleiner | 323/249 |

OTHER PUBLICATIONS

"Using a Small Hybrid Pulse Power Transformer Unit as Component of a High-current Opening Switch for a Rail Gun"; L. M. W. Leung, R. E. Bailey, and P. H. Michels, IEEE Transactions on Magnetics, vol. 28, No. 2, Mar. 1989.

Primary Examiner—Jeffrey A. Gaffin
Assistant Examiner—Ronald W. Leja
Attorney, Agent, or Firm—Fish & Richardson

[57] ABSTRACT

A current limiting method and apparatus for preventing fault overload in a utility power transmission system employs a high power, superconducting coil based pulse transformer for saturating the core of the utility power transformer thereby limiting its current carrying capacity. The utility transformer core is biased to a disadvantageous portion of its B-H curve. A fault condition is detected and as a result the superconducting coil is quenched thereby sending a high energy pulse of current into the utility transformer magnetic core. The core, while heating, does not exceed its capability to maintain a stable thermal condition while at the same time limiting the current being transformed from its input to output lines, until a transformer circuit breaker activates.

5 Claims, 1 Drawing Sheet

CURRENT LIMITERS IN POWER UTILITY APPLICATIONS

BACKGROUND OF THE INVENTION

The invention relates generally to a method and apparatus for reducing the size of utility company switch gear and protecting the sensitive components, such as generators and transformers used by power utilities, and in particular, to a current limiting method and apparatus for controlling the current through such generators and transformers during a fault condition.

In the utility industry, to protect current sensitive components such as generators and transformers, the utilities typically use passive current limiters without the ability to trigger upon the occurrence of a fault. Accordingly, these limiters limit the current only to values which are ten to one hundred times higher than the normal operating values for the equipment.

Since the expense and size of switch gear used by the utilities increases rapidly with fault current ratings, the utilities prefer to use the smallest switch gear which is commensurate with the application. The addition of fast operating current limiters, with tight overload specifications, would allow the utilities to split a high current bus without the requirement of using switch gear on each sub-bus which tolerates a high fault current. For these split-bus services, typically, for example, 240 kV, 4 kA lines, to operate successfully, the fault currents need to be limited to three or four times the normal load current. Thus, a limiter operating for 30 or 40 milliseconds, on a 240 kV line, must be able to sustain a 75–100 MJ energy load per fault.

When a fault occurs, for example a short circuit, the current through the current sensitive components can rise to fault values in less than 1 millisecond. Accordingly, a current limiter to be effective must be able to hold the current to less than several times normal values for at least about 30 milliseconds while the line circuit breaker operates. The line circuit breaker, while effective to decouple the fault from the current sensitive components, will not "kick in" for about 30 milliseconds once the fault occurs.

In the past, there have been two forms of current limiters used in utility power systems. These are inductive limiters and current limiting fuses. The current limiting inductors are air core inductors, having an inductance (L), placed in series with a circuit breaker. They limit current by generating a back voltage (V), due to the changing current (i), as a function of time (t) according to Lenz's and Faraday's laws:

$$V = -L\frac{di}{dt} \qquad \text{(Eq. 1)}$$

The major advantages of inductive limiters are their simplicity, robustness, and low cost.

Current limiting fuses use a non-linear resistance, R, in series with the line, and the fuse vaporizes when the current exceeds a specified rating. These fuses accordingly are not reusable, and if reusable, would provide a back voltage depending upon the temperature of the limiter in accordance with Equation 2:

$$V = iR(i,T) \qquad \text{(Eq. 2)}$$

The advantages of a current limiting fuse are its low cost and positive action in the case of a fault.

Superconducting variants of these types of current limiters have been built. In addition, transformer type devices have also been built. The superconducting version of the current limiting fuse depends on a large change in resistance from the superconducting to a normally conducting state and the potential that the device can be made reusable. Some superconducting limiters, operating at voltages lower than that of interest to the power utilities, have also been described in the literature.

Series limiters have the limitation that they must operate at the operating potential. For passive devices, where there is adequate room in the utility switch yard, this is rarely a problem. However, if the device is switchable, then a high voltage transformer-like structure must be built for the trigger signals and the associated electronics. This adds to the complexity and cost of the limiter and active series limiters can also have difficulty in failing "safely." That is, they may not have sufficient heat capacity to prevent melting if a current switch fails to open in the allotted time.

For inductive limiters, the effect of the series inductance during operation needs to be minimal. If the value is small enough so that only a small amount of voltage appears across the inductor during normal operation, there is likely to be only a modest current limiting, for example, after the operating current is greater than ten times its normal value. In addition, there is no capacity to trigger a normal metal inductive limiter.

The current limiting fuse can cause a voltage spike of two or three times the system voltage when the fuse opens. Thus, the insulation required in the system must be adequate to handle the spike. Also, the fuse operates only once before replacement, and replacement can be a time consuming process. The vaporization of melted metal in fuses also limits the upper voltage at which they can be used.

Accordingly, an object of the present invention is an apparatus for limiting current in current sensitive components of a utility distribution process in which the current limiter limits currents to between three and ten times the normal operating current using a triggerable apparatus. Other objects of the invention are an economical, modest size, and reusable method and apparatus for limiting current in power utility switch gear. Yet another object of the invention is a fast-acting method and apparatus which can be added to existing switch gear equipment in a simple and economical manner for limiting current there through.

SUMMARY OF THE INVENTION

The invention relates to a method in apparatus for limiting current transfer in a power transformer. The method features detecting a current fault condition causing dangerously high currents to pass through the transformer and applying sufficient current to the transformer core to bias it into a saturated state for a sufficient time to protect the transformer until operation of a transformer circuit breaker. In another aspect, the method features applying a current pulse to the transformer core for limiting current passing through the transformer using a superconducting coil pulse transformer.

The apparatus of the invention features circuitry for connecting a high current pulse source for saturating the transformer core wherein the source has sufficient energy to effect saturation. The source of pulse energy has a transformer having a superconducting primary winding and further has elements for quenching or rapidly discharging without quenching the superconducting winding in response to a fault detection signal.

BRIEF DESCRIPTION OF THE DRAWINGS

Other objects, features and advantages of the invention will be apparent from the following drawings in which.

DESCRIPTION OF A PARTICULAR EMBODIMENT

Figure 1:
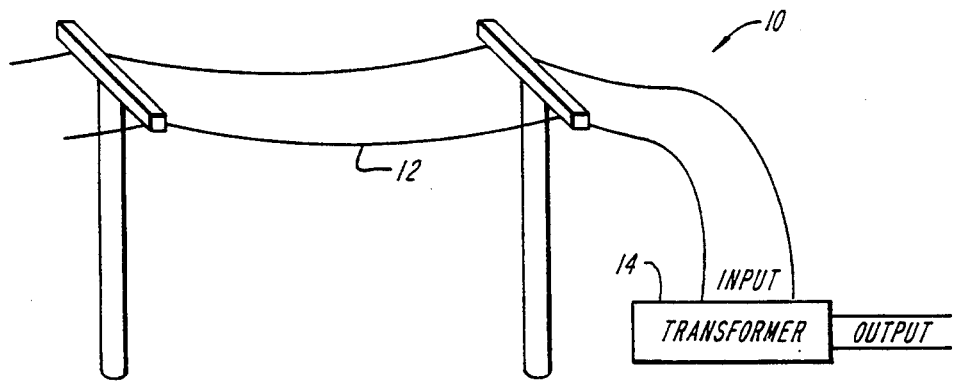
FIG. 1 is a schematic representation of a portion of a utility distribution system.

Referring to FIG. 1, in a typical utility transmission system 10, the transmission lines 12 nearly always terminate at transformers 14. Transformers have a demonstrated track record of robustness and reliability, and therefore it is advantageous to use the transformers in a manner which provides a device which fails safe, which is mechanically, thermally, and electrically robust, and which does not interrupt or substantially change the operation of the transmission line.

Figure 2:
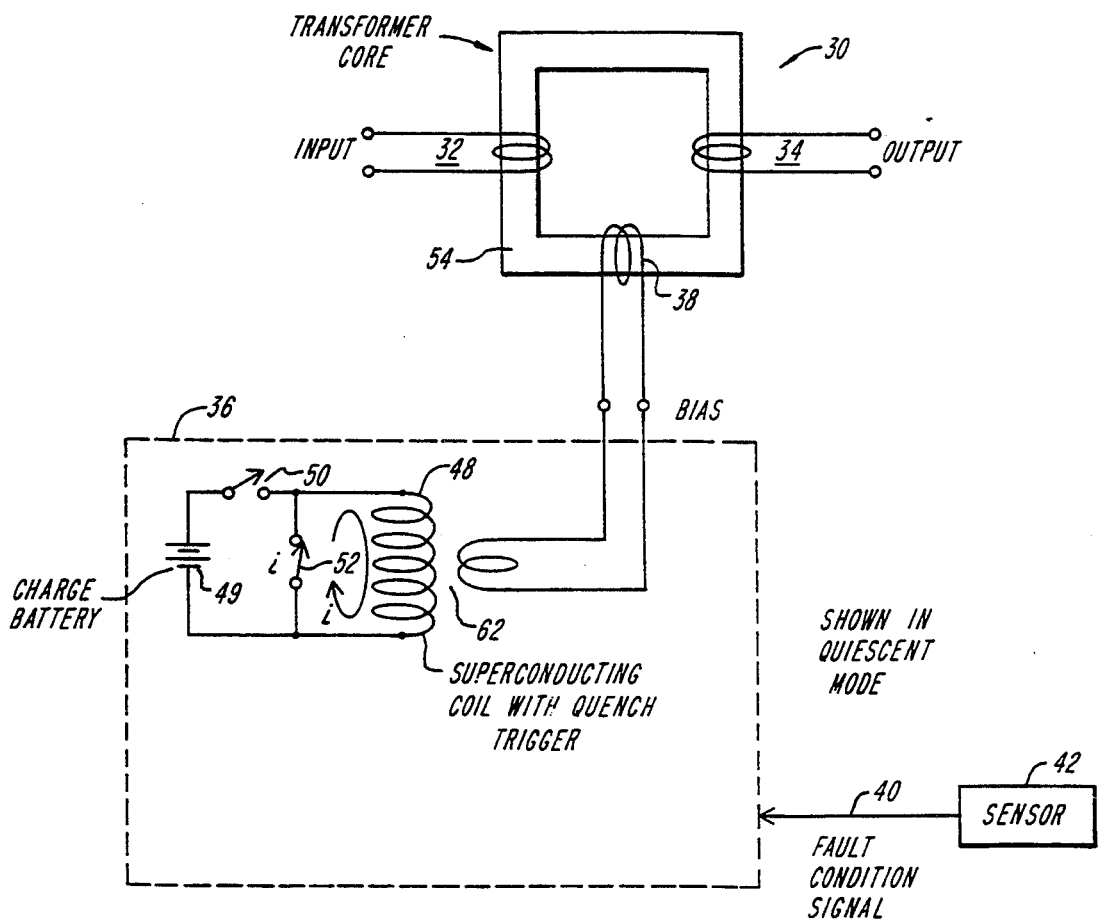
FIG. 2 is an electrical schematic drawing illustrating a superconducting current limiter connected in accordance with the invention.

In accordance with the illustrated embodiment of the invention, referring to FIG. 2, a transformer 30, has an input side 32, and an output side 34, each connected to a respective primary and secondary winding of the transformer 30. In accordance with a preferred embodiment of the invention, a hybrid pulse power transformer 36 such as that developed by General Dynamics Corporation in San Diego provides a method of pulsing the transformer core, so that the core saturates, thereby limiting the amount of current which can be drawn from the transformer because the transformer is then operating in a different, non-optimum portion of its B-H curve. Biasing the transformer core in this way produces operation very similar to that which can be found in the operation of a magnetic amplifier.

In accordance with the invention, a bias winding 38 is provided through which magnetic core saturation can be achieved upon the detection of a fault condition. A source of bias current is provided to the bias winding from the hybrid pulse power transformer 36 which is triggered in response to a fault condition signal over line 40 to produce a pulse of current upon the detection by a sensor 42 of a fault condition. Sensor 42 measures, for example, the current in the secondary winding of transformer 30.

This method of operation causes the transformer to generate high frequency harmonics, induces current in the transformer case and heats other components of the transformer. If allowed to operate for a long period of time, this mode of operation could be detrimental to the transformer; however, the large mass of the transformer limits the temperature rise and allows sufficient time for the switch gear to open the circuit (using a circuit breaker, not shown). Since nearly all high power transformers have surge current ratings which provide a margin for continued safe operation, they can typically operate at twice their rated current for periods of minutes to hours, and at three or four times the rated current for tens of seconds to several minutes without suffering damage. This generally results because large transformers are often designed with a substantially more iron (core) than is necessary in order to reduce the hysteresis losses in the iron. This large quantity of iron, however, makes it more difficult to saturate the core and a large current must be applied to winding 38 to induce substantial flux in the core to reduce the short circuit current carrying capacity of the transformer during a fault condition.

In alternate embodiments of the invention, in some core configurations, current can be injected into the transformer core through the transformer neutral. For example, for wye connected transformers, with proper core configuration, the neutral would need to be lifted from ground and the secondary of the hybrid pulse power transformer would be connected in series with the neutral lead of the power transformer. Alternately a separate winding can be added to the core to effect this bias. In a design as described below, the hybrid pulse power transformer will always be fail safe.

The hybrid pulse power transformer used in connection with the invention is illustrated in FIG. 2. It is described in greater detail in the manufacturer's paper attached as Appendix A. It consists of a superconducting coil 48 with a "quench trigger." The coil can be charged from a power source "charge battery" 49 as illustrated. Once the current i in the superconducting coil has been created, a switch 50 is opened (previously closed) and a switch 52 is closed (previously opened) as illustrated in FIG. 2. So long as the coil is maintained in its superconducting state, no bias current is applied to the transformer core 54. When however a fault condition or state is detected, as indicated by a fault detection signal over line 40 from sensor 42, the superconducting coil 48 is quenched, and the energy stored within it is transferred through the transformer 62 to the core of the transformer 30 which then becomes a saturated, thereby limiting its current carrying capacity. The operation of the pulse transformer as a current source thus provides the ability to trigger the current limiting operating, using existing components, to reuse the pulse transformer, and to provide a fail safe design. Note that the quenching of the superconducting coils is not required. The only requirement is that the current discharge rate from the secondary of the high power pulse transformer is adequate to saturate the transformer core.

The high power pulse transformer contemplated herein can handle up to 100 MJ per fault, thus in its circuit configuration, limiting the current through transformer 30 to three to four times its rated capacity. In a preferred embodiment, the quench of coil 48 can take place within one millisecond and the saturation of core 54 will be complete in less than one millisecond. Accordingly, without substantial modification of an existing transmission line, current fault detection and limitation can be achieved at relatively small cost and substantial savings in volume requirements.

Additions, subtractions, and other modifications of the described embodiment will be apparent to those practiced in the field and are within the scope of the following claims.

What is claimed is:

1. A method of current limiting current transfer in a power utility transformer protected by a circuit breaker comprising the steps of detecting a current fault condition causing dangerously high currents to pass through said transformer; and applying sufficient current to a transformer core of said power transformer in response to a detected fault condition to bias it into a saturated state for sufficient time necessary to protect the transformer until operation of said circuit breaker.

2. The current limiting method of claim 1 further wherein said applying step further comprises the step of selectively applying a current pulse to bias said utility transformer core to said saturated state for limiting the current passing through the transformer using a superconducting coil pule transformer.

3. An apparatus for limiting current passing through a power utility transformer comprising a source of high electrical current pulse energy sufficient for saturating a transformer core of said power utility transformer, and means for selectively connecting said high current pulse for saturating said transformer core.

4. The apparatus of claim 3 further wherein said source of pulse energy comprises a transformer having a superconducting primary, and further comprising means for discharging said superconducting primary in response to a fault detection signal at a rate sufficient to saturate the transformer core of said power utility transformer.

5. The apparatus of claim 3 further wherein said source of pulse energy comprises a transformer having a superconducting primary, and further comprising means for quenching said superconducting primary in response to a fault detection signal.

* * * * *